United States Patent [19]

Duffy

[11] 4,189,713

[45] Feb. 19, 1980

[54] REMOTE CONTROL SYSTEMS

[75] Inventor: Neil D. Duffy, Glenrothes, Scotland

[73] Assignee: Pico Electronics Limited, Glenrothes, Scotland

[21] Appl. No.: 704,367

[22] Filed: Jul. 12, 1976

[30] Foreign Application Priority Data

Jul. 25, 1975 [GB] United Kingdom ............... 31329/75

[51] Int. Cl.[2] .............................................. H04Q 9/00

[52] U.S. Cl. ................................ 340/168 R; 340/148; 340/167 A; 340/164 R

[58] Field of Search ........... 340/167 A, 167 R, 168 R; 328/136; 325/28

[56] References Cited

U.S. PATENT DOCUMENTS

| | | | |
|---|---|---|---|
| 2,415,929 | 2/1947 | Bond | 325/28 |
| 2,490,243 | 12/1949 | Tellier | 328/136 |
| 3,243,799 | 3/1966 | Parks | 340/353 |
| 3,427,585 | 2/1969 | Milford | 340/146.1 BA |
| 3,551,885 | 12/1970 | Henzel | 340/146.1 BA |
| 3,624,603 | 11/1971 | Delcomyn | 340/146.1 BA |
| 3,705,363 | 12/1972 | Okada | 340/167 A |
| 3,755,744 | 8/1973 | Fukata | 340/167 R |
| 3,852,713 | 12/1974 | Roberts | 340/167 A |
| 3,852,722 | 12/1974 | Neuville | 340/168 CC |
| 4,006,462 | 2/1977 | Popowski | 340/167 A |

*Primary Examiner*—Harold I. Pitts

*Attorney, Agent, or Firm*—Gajarsa, Liss & Conroy

[57] ABSTRACT

An acoustic remote control link transmits different value bits as pulses containing different numbers of carrier cycles and identifies those bits on reception on the basis of the received pulses containing numbers of carrier cycles in one or other of two ranges. Each word transmitted is accompanied by a word of inverse digital value, the two words being compared on reception. A received pulse is deemed to have finished when a gap of given duration exists in the carrier.

15 Claims, 10 Drawing Figures

REMOTE CONTROL SYSTEMS

BACKGROUND OF THE INVENTION

The present invention is concerned with remote control systems and is particularly applicable to such systems in which spurious signals are likely to occur, as when the system uses an acoustic signal link of sonic or ultrasonic frequency.

An ultrasonic control system could be based upon pulse code modulation or a similar coding system but then becomes very sensitive to spurious signals and sigdistortions caused by reflections and multiple path propagation. Conventionally, therefore an ultrasonic link is normally based upon multi-frequency coding, even though this requires accurate frequency control and can suffer from errors when either the transmitter or receiver of the link is moving.

The present invention therefore proposes a pulse code modulation system with provision for compensating for or at least detecting spurious signals and signal distortion.

SUMMARY OF THE INVENTION

According to one aspect of the invention, there is provided a remote control system having: a transmitter comprising an output transducer, modulating means coupled to the transducer, the modulating means having a first input for receiving an oscillatory carrier signal of predetermined frequency and a second input connected to a modulating signal producing means, the modulating signal producing means having a data input for receiving a data signal representing data to be transmitted and being arranged to produce such a pulse coded modulating signal representing said data that said data is transmitted in digital form as a series of carrier signal pulses in which two different value bits are represented respectively by one and the other of two predetermined numbers of cycles of the carrier signal; and a receiver comprising an input transducer, and counting means for counting the cycles of each pulse of the carrier signal received by the input transducer to convert each pulse into a signal representing one or other of said two bits whenever the number of cycles in that pulse is within one or other, respectively, of two non-over-lapping ranges.

According to another aspect of the invention, there is provided a transmitter comprising an output transducer, modulating means coupled to the transducer, the modulating means having a first input for receiving an oscillatory carrier signal of predetermined frequency and a second input connected to a modulating signal producing means, the modulating signal producing means having a data input for receiving a data signal representing data to be transmitted and being arranged to produce such a pulse coded modulating signal representing said data that said data is transmitted in digital form as a series of carrier signal pulses in which two different value bits are represented respectively by one and the other of two predetermined numbers of cycles of the carrier signal, the transmitter also comprising means for transmitting each of said bits for a second time but in inverse form.

According to another aspect of the invention, there is provided a receiver comprising an input transducer, and counting means for counting the cycles of each pulse of the carrier signal received by the input transducer to convert each pulse into a signal representing one or other of said two bits whenever the number of cycles in that pulse is within one or other, respectively, of two non-overlapping ranges.

According to a further aspect of the invention, there is provided an oscillator for providing the carrier signal, the oscillator comprising a bistable circuit, and a control circuit for changing the state of the bistable circuit, the control circuit comprising power supply conductors, capacitors connected to the conductors and to the respective inputs to the bistable circuit, and controllable switching means arranged to change the charges of the capacitive means in dependence upon the state of the bistable so as to cause the signals on the inputs to the bistable circuit to change in a sense to change the state of the bistable circuit.

BRIEF DESCRIPTION OF THE DRAWINGS

For a better understanding of the invention, and to show how the same may be carried into effect, reference will now be made, by way of example, to the accompanying drawings, in which.

DESCRIPTION OF A PREFERRED EMBODIMENT

Figure 1:
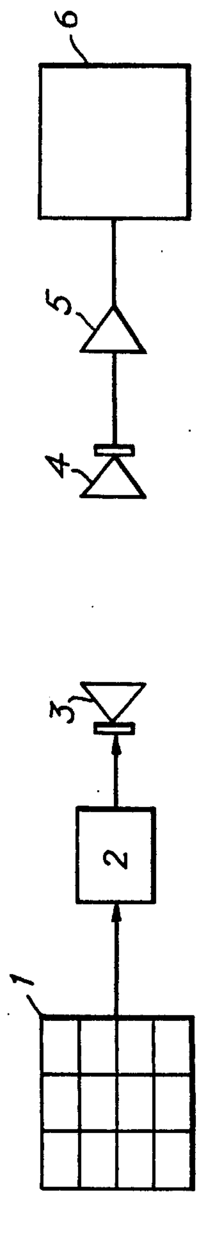
FIG. 1 shows a transmitter-receiver remote control link in block diagram form.

The embodiment now to be described is a remote control link comprising, as diagrammatically shown in FIG. 1, a transmitter having a keyboard 1, transmitting logic circuit 2, a transmitting transducer 3, and a receiver having a receiving transducer 4, amplifier 5 and receiving logic circuit 6. The transducers are ultrasonic transducers operating at 40 KHZ. However the link could also be constructed to operate at audio frequencies.

The basic principle of operation is that the transmitter transmits narrow and wide blocks of carrier i.e. a form of pulse code modulation, and the receiver decodes the pulses to produce required control signals.

The transmitter and receiver as described can be implemented either in 7400 series logic or on an insulated gate field effect semiconductor chip.

The transmitter, as will be described in more detail hereinafter, can transmit up to 24 different codes i.e. 24 discrete instructions, all at 40 KHZ. This is to be contrasted with other remote control links which use a multiplicity of different frequencies around 40 KHZ, each frequency being a discrete instruction. Such other links have the drawback that if the transmitter is moved rapidly when a key is depressed, doppler frequency shift causes an incorrect instruction to be received. Also the use of a multifrequency system requires that both the receiver and transmitter have very stable oscillators running at the same frequencies; this necessitates the use of crystal oscillators which are relatively expensive.

Pulse code modulation, as now proposed for an ultrasonic remote control link, also suffers from various problems as will be described hereinafter. The present embodiment contains various features to overcome the problems and the complete system does not suffer from the drawbacks of a multifrequency system.

The basic principles of this embodiment of link will now be described.

When a key of the keyboard is operated, power is automatically applied to the transmitting logic circuit and transmission of the code corresponding to the key operated is commenced. While the key is held, transmission of the code is sequentially repeated. When the key is released transmission ceases at the end of a sequence.

Figure 2:
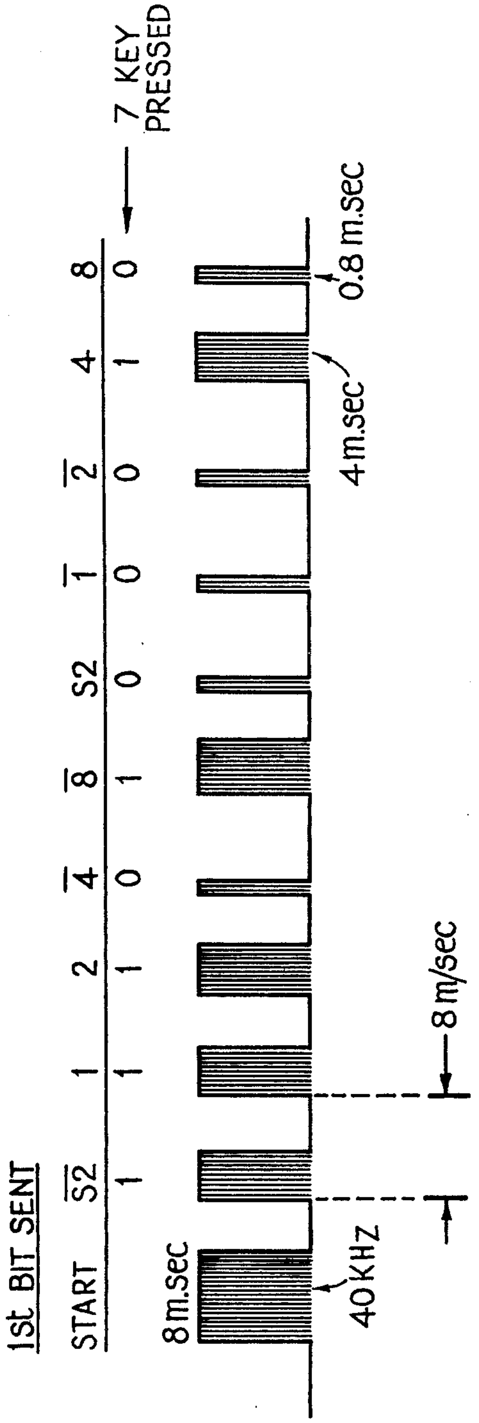
FIG. 2 shows a waveform of a transmitter output signal.

The transmitted code is shown in FIG. 2. The transmitting logic circuit is such that, regardless of oscillator frequency, a start code is transmitted as a block of 320 pulses, the '1' code as a block of 128 pulses and the '0' code as a block of 32 pulses. Each transmitted code sequence contains a start code followed by a first 5 bit data word defining the key operated and a second 5 bit data word which is the inverse of the first word.

The signal is received by the receive transducer, amplified and fed to the receiving logic circuit. The number of pulses in each block is established by interrogating the contents of a pulse counter in the receiving logic circuit at the end of each block. The end of a block is identified by the absence of a pulse for 0.5 m.sec. The resultant code is fed to a shift register and when a complete sequence of eleven blocks has been received by the shift register, the contents of the shift register are clocked out to a latch circuit to provide control signals. This only occurs if a comparator monitoring the parallel output of the shift register signals an equality between the inverted and non-inverted version of the 5 bit data word, the former being restored to the non-inverted form before being fed to the comparator.

Moreover, the 'start', '0' and '1' blocks are identified in the receiver as follows. If a block contains at least 255 pulses it is recognised as a 'start' pulse (transmitted as 320 pulses). If this condition is not found but there are at least 98 pulses in a block, the block is recognised as a '1' block (transmitted as 128 pulses). Finally if neither of these conditions is met and there are at least 19 pulses, a '0' block is recognised (transmitted as 32 pulses).

Because of reflection and multiple path propagation a block of pulses can be distorted in several ways. Firstly, interference between direct and reflected pulses can cause certain pulses in a block to be reduced in amplitude below the threshold of the receiver. Taking a '0' block for example, only 19 of the 32 transmitted pulses need be above the threshold and the remainder should not produce a gap in the block of more than 0.5 m.sec. otherwise the receiver counter will be reset. It will be seen therefore that the receiver is extremely tolerant to such pulse loss as the probability of more than 13 pulses being omitted or of a gap of more than 0.5 m.sec. occurring is very low. Moreover, owing to the inversion, this fault would need to occur twice before erroneous information was accepted.

In addition, block distortion can occur by multiple path propagation lengthening the block.

If the received block is merely lengthened, then provided that the block is not lengthened by an amount which causes it to be recognised as the next higher length block, no problem is caused. The block lengths are chosen to ensure that this problem is minimised.

If the received block is lengthened by a number of separated small blocks, then provided that the small spurious blocks are not longer than 19 pulses they are not recognised by the logic.

If despite the above, an incorrect block is received and passed, the receiver comparator will not record equality at the end of a code sequence, unless there is the unlikely event of the same error in the inverted code word.

The oscillator frequencies of the transmitter and receiver do not need to be synchronized and are not critical except in the need for the transmitter oscillator to operate in the region of the resonant frequency of the transmitting transducer 3. This requirement is made less arduous if a wide bandwidth e.g. 4 KHZ transducer is used.

Figure 3:
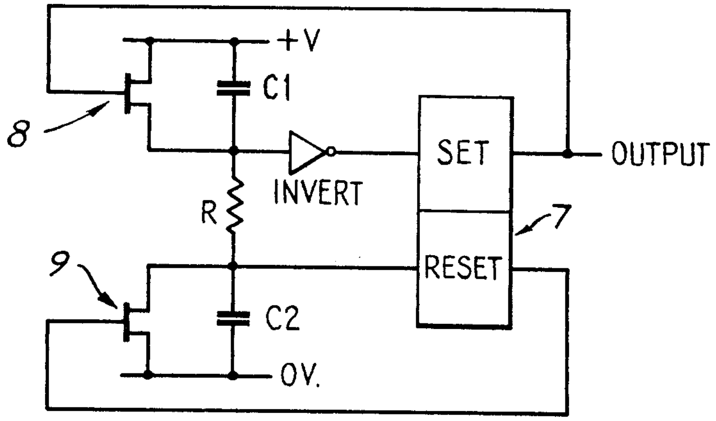
FIG. 3 shows the circuit of an oscillator for use with the transmitter.

When the transmitter is implemented as an IGFET circuit it is desirable to operate the circuit from a battery. The battery voltage may fall by as much as 40% during its lifetime. Conventional oscillators built into IGFET circuits are of an R/C relaxation oscillator type, the oscillation frequency of which is highly dependent on operating voltage. Accordingly for the present embodiment a new type of oscillator was designed as shown in FIGS. 3, 4 and 5.

The oscillator consists basically of two R/C networks RC1 and RC2 and a bistable circuit 7. If capacitor C2 charges to above the reset level of the bistable circuit 7, it will reset circuit 7. If the voltage across capacitor C1 falls below the set level, it will set circuit 7. The output of the circuit 7 controls clamp devices 8 and 9 to discharge the capacitors.

If the output of the circuit 7 is assumed initially to be high and C2 is initially discharged, C2 will charge via R until the circuit 7 is reset and its output goes low. This actuates clamp device 9 to discharge C2 and switches off clamp device 8. Capacitor C1 now charges via R until the circuit 7 is set, when clamp device 8 is operated, clamp device 9 is switched off and the sequence is repeated. The mark of the resulting output waveform is thus determined by RC2 and the space by RC1.

Figure 4:
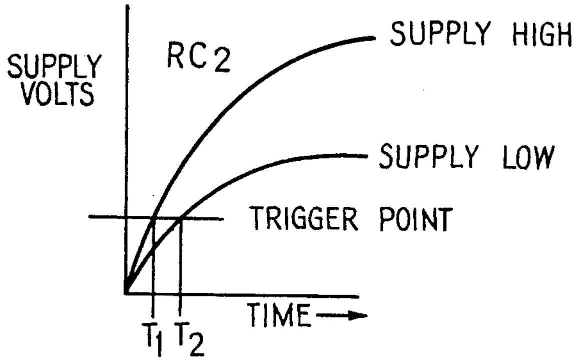
FIG. 4 and FIG. 5 are voltage-time diagrams.
Figure 5:
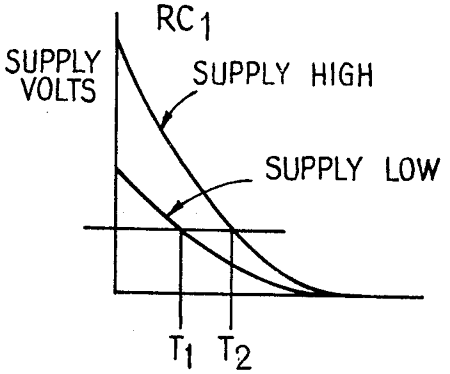

FIG. 4 is a graph showing the operation of RC2. If capacitor C2 starts in the discharged condition then the circuit 7 will be triggered at time T1 if the supply is high and at time T2 if the supply is low; i.e. as the supply voltage is decreased the time is increased.

FIG. 5 is a graph showing the operation of RC1. In this case, as the supply voltage is decreased the time is decreased.

As the supply voltage is decreased the mark will get longer and the space shorter. By choice of C1 and C2 or by making either C1 or C2 variable it is possible to set the mark space ratio such that the ratio will change when the supply voltage is changed but the change in the mark will substantially compensate the change in the space thus keeping the frequency constant.

Changing R will affect the mark and space by the same proportions and will thus not change the mark space ratio but only the frequency of operation.

Figure 6:
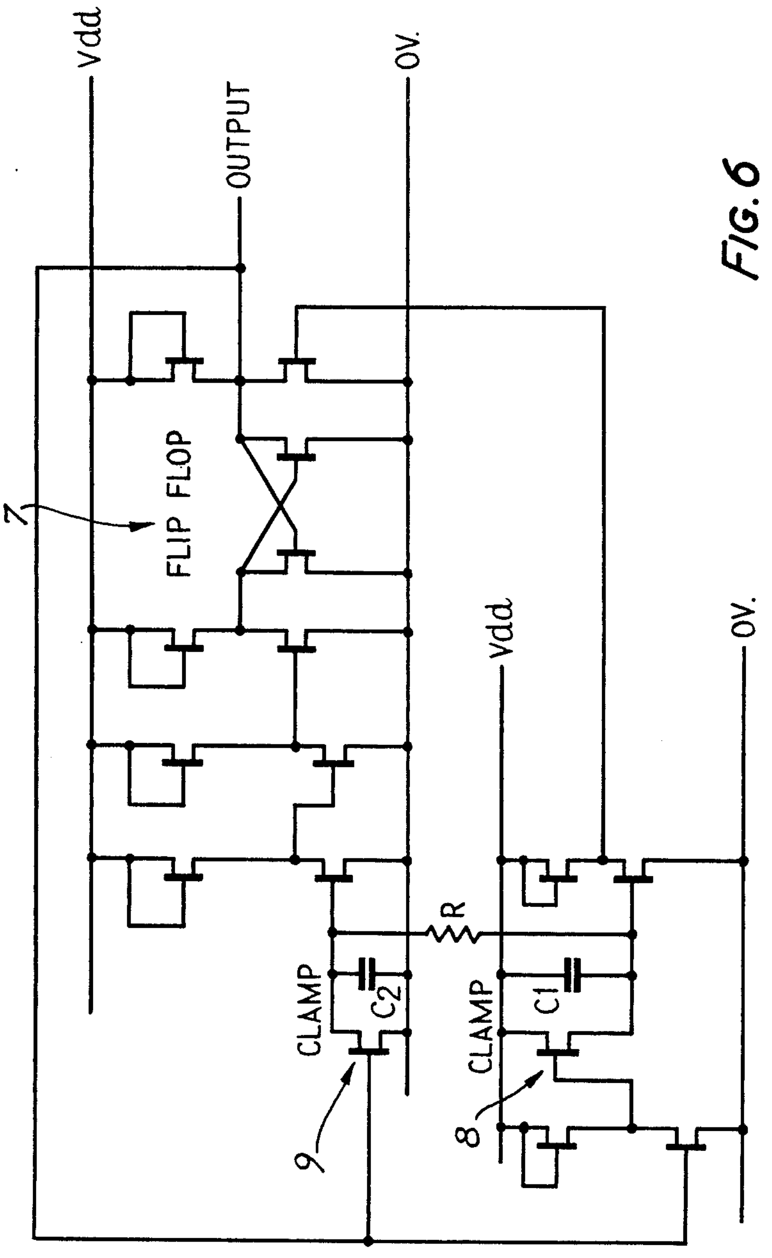
FIG. 6 shows the circuit of the oscillator when implemented using IGFET techniques.

FIG. 6 shows a realisation of the oscillator in IGFET form.

Figure 7:
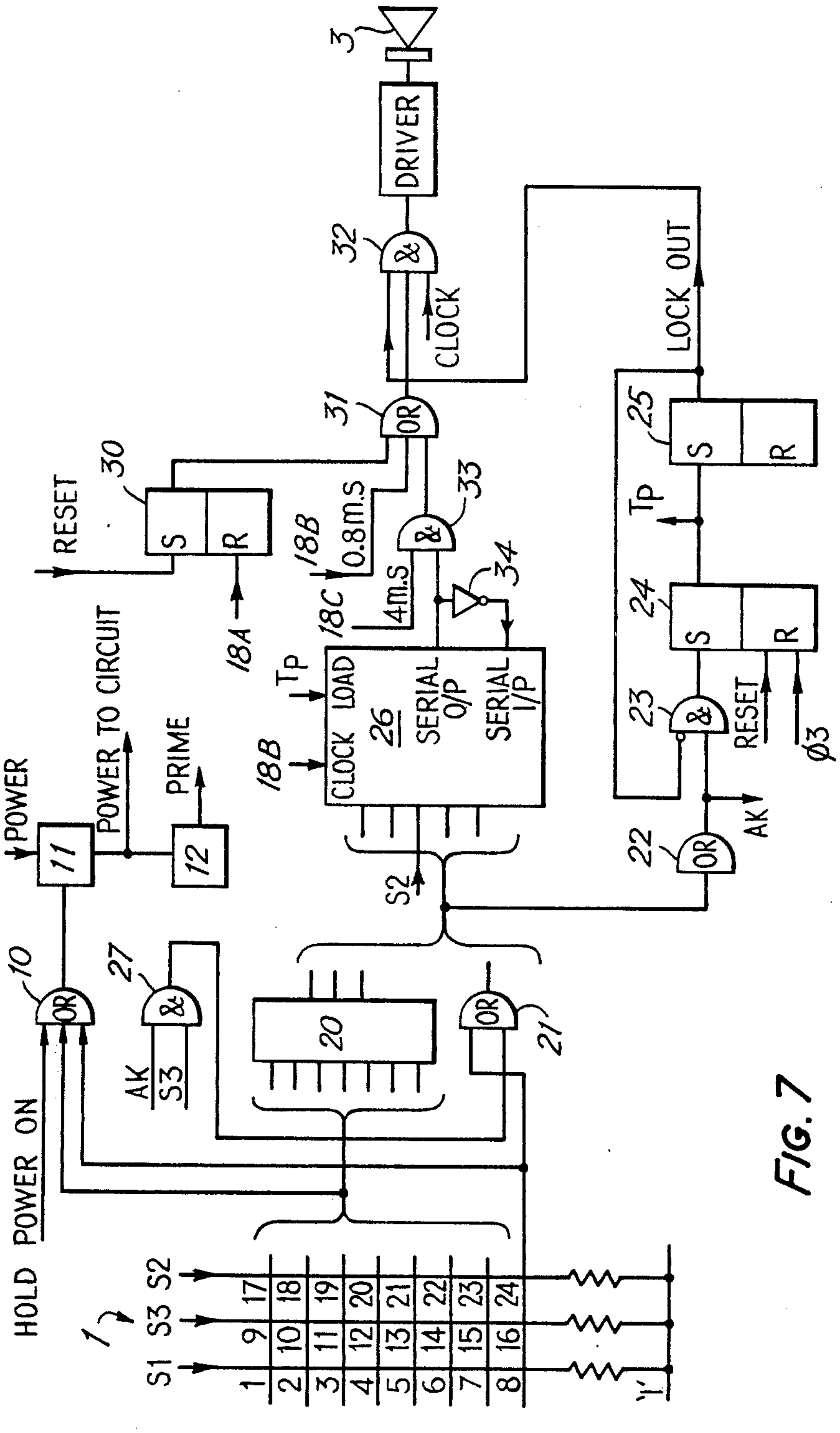
FIGS. 7 and 8 show the transmitter in block diagram form.
Figure 8:
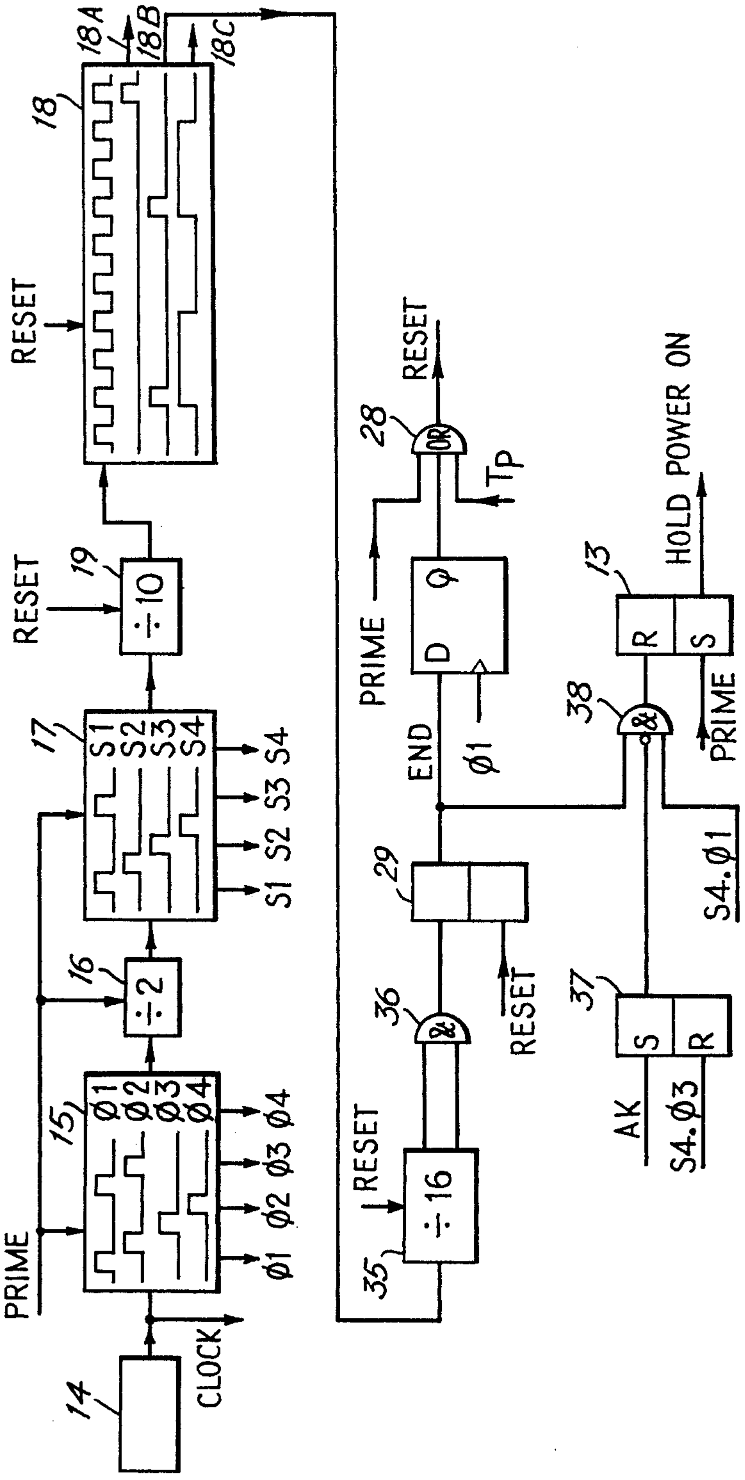

The transmitter will now be described with reference to FIGS. 7 and 8, FIG. 7 showing the basic elements of the transmitter and FIG. 8 showing the means for producing certain timing and control signals for the circuit of FIG. 7.

When any key of the keyboard 1 is pressed a logic '1' is applied to one of the inputs of an OR gate 10. This operates a power switch 11 so that power is applied to the circuit elements of the transmitter. (OR gate 10 has power permanently applied).

When power is applied, a prime circuit 12 emits a pulse (PRIME) to prime elements of the transmitter into their correct states for commencing operation. The PRIME pulse sets a latch 13 to cause OR gate 10 to produce a signal keeping switch 11 on even though the key is subsequently released.

The stable oscillator, denoted 14 in FIG. 8, starts up when power is applied and drives a clock generator 15 which operates, via a divide-by-two circuit 16, an S-signal generator 17 producing pulses S1, S2 and S3 to strobe the keyboard 1, these pulses overriding the effects of the resistors, connected to logic '1', of the keyboard. Generator 17 operates a decoder 18 via a divide-by-ten circuit 19 to produce control signals 18A, 18B and 18C used in the circuit of FIG. 7.

Returning to FIG. 7, a 7 line to 3 line binary decoder 20 and an OR gate 21 convert signals on the lines from the keyboard into binary code. The output of an OR gate 22 goes high, when the appropriate S pulse strobes the column of the keyboard in which the key is depressed, to produce an ANY KEY (AK) signal. When the gate 22 output goes high, a latch 24 is set via AND gate 23 and a latch 25 is set, inhibiting gate 23 (via an inhibit input). Latch 24 is reset by a clock pulse $\phi 3$ from clock generator 15. The output of latch 24 is thus a pulse (which is called TP).

Pulse TP is used to load a shift register 26 with the data from decoder 20 and gate 21. Thus, the shift register holds a binary code representing the key depressed. The same eight keyboard lines are used to represent three sets of numbers: 1 to 8, 9 to 16 and 17 to 24. The set of number 17 to 24 is distinguished by the logical value of the input S2 on the shift register 26, which input is connected to output S2 of generator 17 (FIG. 8). When the column 17 to 24 is strobed, input S2 of register 26 has a high level signal, otherwise it has a low level signal. Similarly when column 9 to 16 is strobed, the signal at input S3 of AND gate 27 and thus also at the output of OR gate 21 has a high level signal.

When pulse TP is produced, gate 28 (FIG. 8) generates a RESET signal which resets counter 19 and latch 29 and sets latch 30 (FIG. 7).

Latch 30 being set, the output of an OR gate 31 goes to a logic 1, AND gate 32 is enabled and transmission is commenced, the start code block being transmitted first. An example of a transmitted code is shown in FIG. 1. With the oscillator 14 running at 40 KHZ, counter 19 changes state every 0.8 m.sec. Latch 30 is reset after 10 pulses i.e. 8 m.secs. Counter 19 feeds a decoder 18, having three outputs 18A, 18B and 18C. Output 18B drives gate 31 directly for generating a train of '0' blocks of 0.8 m.sec. duration each. Output 18B also clocks shift register 26. The output of shift register 26 is gated by gate 33 with the output 18C of decoder 18, to generate 4 m.secs. '1' blocks when the output of shift register 26 is a logical '1'. The pulses of 0.8 m.sec. from output 18B are each produced during the period of production of a corresponding 4 m.sec. pulse from output 18C. Thus when the output of register 26 is '0', AND gate 33 is inhibited and a 0.8 m.sec. pulse is fed through OR gate 31 to gate 32. When the output of register 26 is '1' the 4 m.sec. pulse is fed through gate 33 to gate 31 in addition to the 0.8 m.sec. pulse from output 18B. The input marked 'CLOCK' of AND gate 32 is fed with 40 KHZ from oscillator 14 to be pulse modulated by the signals from gate 31.

The serial output of shift register 26 is inverted at 34 and fed to its serial input. Thus the 5 bit contents of the shift register are inverted and retransmitted.

Counter 35 (FIG. 8) which is fed from output 18B counts complete cycles of counter 19 and at the start of the 12th cycle sets latch 29 via gate 36. A reset signal is generated by gate 28 and provided that the key is still held depressed the complete sequence of code transmission is repeated.

If the key is released during any sequence of code transmission, latch 37 will be in the reset condition since the AK signal from OR gate 22 will not have set it. When latch 29 generates an END signal, a gate 38 will reset latch 13 and remove the 'hold power on' signal from gate 10. Power to the circuit will then be removed.

Figure 9:
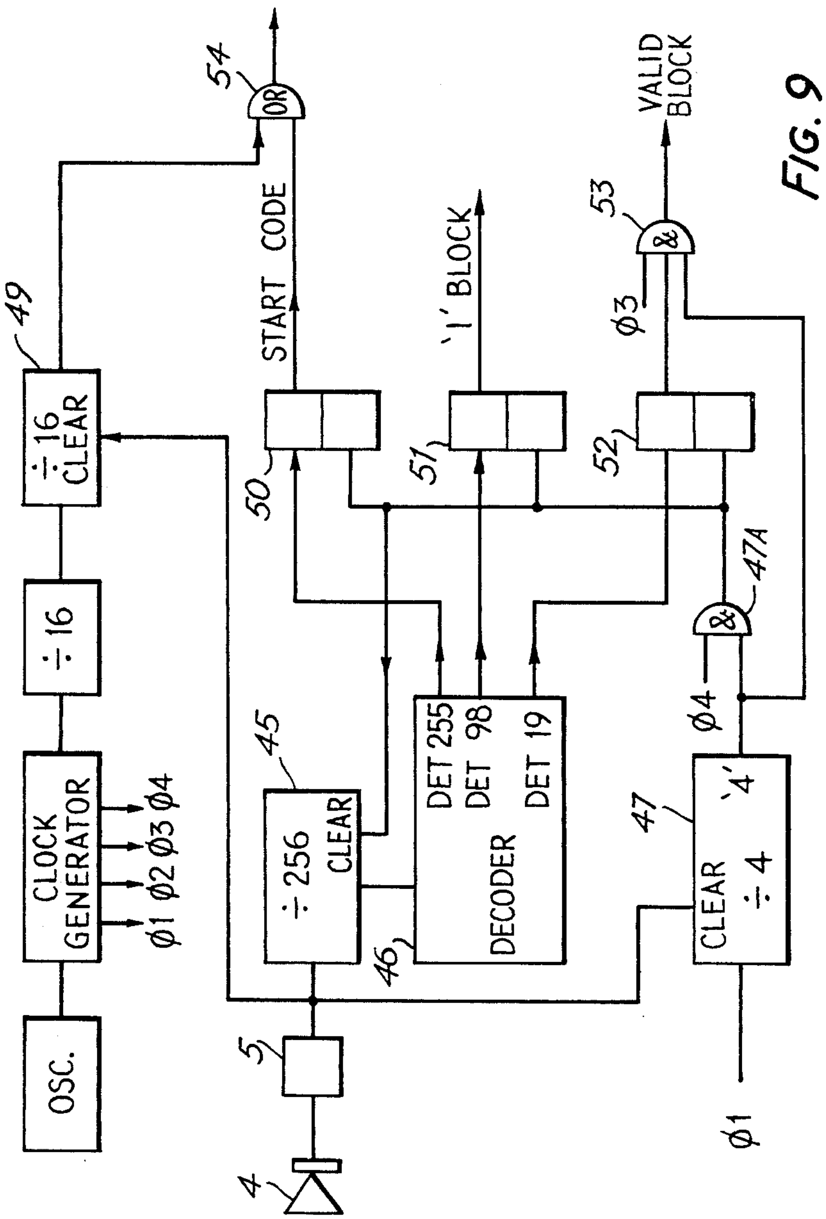
FIGS. 9 and 10 show the receiver in block diagram form.
Figure 10:
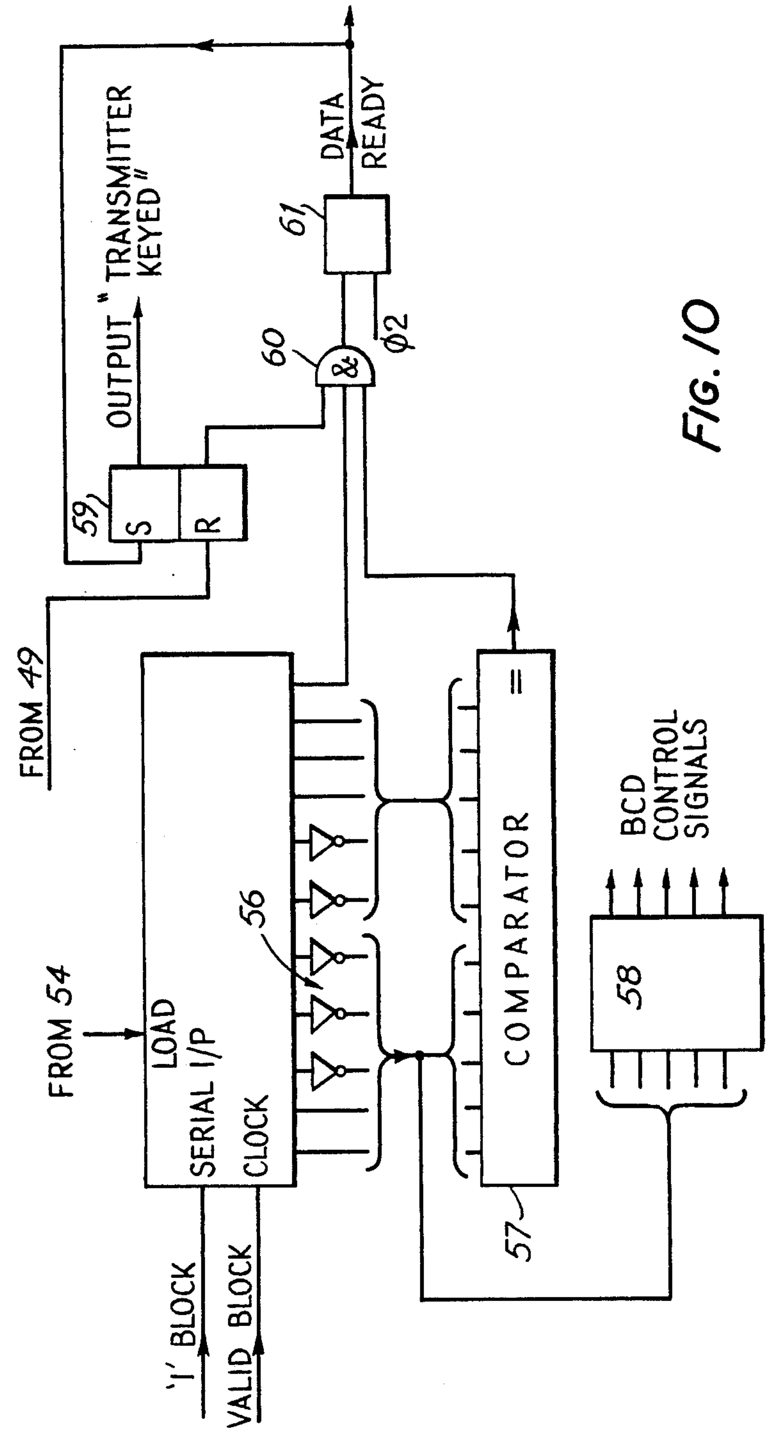

The receiver is shown in FIGS. 9 and 10.

The sonic/ultrasonic signal is received by transducer 4 and amplified by amplifier 5, the amplifier being arranged to produce at its output a signal the oscillatory portions of which correspond only to those oscillatory portions of the transducer output signal having an amplitude greater than a preset value.

The incoming pulses are counted by counter 45 and the pulses clear counters 47 and 49. Decoder 46 detects certain counts from counter 45, corresponding respectively to 255, 98 and 19 pulses passed by amplifier 5.

At the end of a pulse block, counter 47 is no longer being cleared and thus counts up $\phi 1$ pulses from generator 44. After 0.5 m.sec., counter 47 gives an output to gates 47A and 53.

Provided that latch 52 has been set (i.e. there were at least 19 pulses in the block) shift register 55 (FIG. 10) is clocked, a '1' being clocked in if latch 51 has been set (>98 pulses) a '0' otherwise.

If latch 50 has been set (>255 pulses) a start code is indicated. Immediately after data has been clocked into shift register 55 by gate 53, gate *47a* resets counter 45 and latches 50, 51 and 52 in readiness for the next block of pulses.

The received code will begin with a start code which will load the binary sequence 10000000000 into shift register 55. Subsequent blocks clock '1's or '0's into the shift register as appropriate.

When 10 ('1' or '0') bits have been clocked into the shift register, the 1 bit loaded by the start code will be shifted to the right-hand end and will enable AND gate 60. The data in the shift register 55 contains two 5 bit data words, one word inverted. The inverted word is restored by inverters 56 and the two words are compared by comparator 57. If an equality is indicated, the output of gate 60 will go high. The output is timed by a D-type bistable circuit 61 and a 'DATA READY' signal generated. This signal sets 'TRANSMITTER KEYED' latch 59 and clocks the data into latches 58 the outputs of which are control signals to any system being controlled. Latch 59 being set prevents any subsequent DATA READY signals being generated by inhibiting gate 60.

When the transmitter ceases to transmit code, counter 49 (FIG. 9) counts up, until it reaches a count of 16 approximately 25 m.secs. after transmission has ceased, its output then resetting shift register 55 to 10000000000 and resetting latch 59. Latch 59 is thus set from the time the receiver receives the correct code until the transmission ceases; the 'transmitter keyed' signal can be used in conjunction with control signals to provide control signals which are only present when a transmitter key is depressed.

In the event of the first code sequence received being incorrect, i.e. an error introduced due to propagation effects, then provided that the transmitter is still keyed, the next code sequence will begin with a start code which will load shift register 55; the system will then give an output if the second sequence is correctly received.

U.S. application Ser. No. 670421 discloses an alternative embodiment of the invention.

I claim:

1. A remote control system having:

a transmitter comprising:

(a) an output transducer, (b) modulating means coupled to feed the transducer and having input means for receiving a carrier signal of predetermined frequency and for receiving a modulating signal, (c) modulating signal producing means having a data input for receiving a data signal representing instructions for remote control and a data output connected to said input means for controlling said modulating means to produce, for each instruction, a pulse code modulated signal representing the instruction as a multi-bit digitally encoded word, (d) wherein said modulated signal comprises pulses of carrier cycles for representing two differently valued bits of said word by one and the other of two predetermined numbers of cycles of the carrier signal; and a receiver comprising:

(a) an input transducer, (b) counting means for counting the number of cycles of carrier signal in each received pulse as transmitted by said transmitter and received by the input transducer, and (c) determining means receiving from said counting means the count of said number of cycles of carrier signal in each received pulse, for determining whether said number of cycles is within a first range of numbers or within a second range of numbers, said first and second ranges of numbers being non-overlapping and including no numbers in common, and (d) means for converting a received pulse into a signal representing one or another of said differently valued bits whenever said determining means determines that the count of the number of cycles in the received pulse is included in said first or in said second range of numbers, respectively.

2. A system as claimed in claim 1, in which said transducers are acoustic transducers.

3. A system as claimed in claim 2, wherein the transmitter is operable to transmit a data word and its digital inverse and the receiver comprises a comparator for comparing said words as interpreted by the converting means for emitting an acceptance signal when it is detected that the words represent inverse values.

4. A system as claimed in claim 3, wherein the receiver comprises timing means for defining the end of a received carrier pulse when the timing means detects a gap in the received carrier of more than a given duration.

5. A circuit as claimed in claim 1, wherein said modulating signal producing means is operable to produce signals representing said data such that the modulated signal comprises a pair of sets of carrier signal pulses, each set representing said data as a multi-bit digitally encoded word, said modulating signal producing means also producing, in association with each pair of sets of carrier pulses, a further carrier pulse of a third predetermined number of pulses.

6. A circuit as claimed in claim 1, wherein the modulating means is a gating circuit having a first input connected to receive said signals from the signal producing means and a second input connected to said source.

7. A circuit as recited in claim 6, wherein said modulating signal producing means comprises clock signal generating means, decoding means connected to receive clock signals from said clock signal generating means and for producing timing pulses having durations corresponding to said predetermined numbers of cycles of carrier signal, and means for passing said timing pulses to said first input in dependence upon the data signals at said second input.

8. A circuit as claimed in claim 1, further comprising a source for said carrier signal, the source comprising an oscillator having:

a bistable circuit having a set input and a reset input and complementary outputs;

power supply conductors;

a first capacitance coupled to the conductors and to the set input to control the setting of the bistable circuit in dependence upon the charge on the first capacitance;

first switching means coupled across the first capacitance for changing the charge on the first capacitance in dependence upon one of said complementary outputs;

a second capacitance coupled to the conductors and to the reset input to control resetting of the bistable circuit in dependence upon the charge on the second capacitance; and second switching means coupled across the second capacitance for changing the charge on the second capacitance in dependence upon the other of said complementary outputs, the values of the two capacitances determining the durations of the respective states of the bistable circuit.

9. A receiver circuit for receiving a multi-bit digitally coded instruction in the form of a sequence of pulses, each pulse comprising a plurality of cycles of a carrier, the receiver circuit comprising:

(a) counting means for counting the number of cycles of carrier signal in each pulse, and (b) determining means receiving from said counting means the count of said number of cycles of carrier signal in each pulse for determining whether said number of cycles is within a first range of numbers or within a second range of numbers, said first and second ranges of numbers being non-overlapping and including no numbers in common, and (c) means for producing for each such pulse a signal of one or another of two values responsive to a determination by said determining means that the count of the number of cycles in the pulse is included in said first or said second ranges of numbers, respectively.

10. A receiver circuit as claimed in claim 9, and further comprising storage means for storing a sequence of 2n of said signals of one or the other of two values, and means for comparing the value represented by n of those stored signals with the value represented by the remaining n stored signals and emitting an acceptance signal when the two values are in inverse relationship.

11. A receiver circuit as recited in claim 9, wherein the determining means further determines whether a received pulse has a number of cycles of carrier signal in a third range of numbers different from and not overlapping said first and second ranges to produce a signal to identify the reception of an associated sequence of carrier pulses conveying data.

12. A receiver circuit as claimed in claim 1, and further comprising timing means for resetting the counting means when a gap of more than a given duration exists between carrier cycles, thereby to identify the ends of the pulses defining the multi-bit digitally encoded instruction.

13. A receiver circuit as claimed in claim 10, and comprising timing means defining the end of a carrier pulse when the timing means detects a gap in the carrier of more than a given duration.

14. A receiver circuit as claimed in claim 9, and comprising an acoustic receiving transducer coupled to feed a received acoustic signal to the counting means.

15. A receiver circuit as claimed in claim 13, and comprising an acoustic receiving transducer coupled to feed a received acoustic signal to the counting means.

* * * * *